United States Patent [19]

Sashida et al.

[11] Patent Number: 5,020,900
[45] Date of Patent: Jun. 4, 1991

[54] FILM FEEDING APPARATUS

[75] Inventors: Minoru Sashida, Yokohama; Masaaki Yanagi, Tokyo; Katsuhiko Okitsu; Hirokazu Higuchi, both of Yokohama, all of Japan

[73] Assignee: Canon Kabushiki Kaisha, Tokyo, Japan

[21] Appl. No.: 432,585

[22] Filed: Nov. 7, 1989

[30] Foreign Application Priority Data

Nov. 7, 1988 [JP] Japan ................................ 63-281003
Nov. 7, 1988 [JP] Japan ................................ 63-281005

[51] Int. Cl.⁵ .............................................. G03B 23/12
[52] U.S. Cl. .................................................. 353/26 R
[58] Field of Search ................... 353/26 R, 26 A, 68, 353/DIG. 2, 25

[56] References Cited

U.S. PATENT DOCUMENTS

| | | | |
|---|---|---|---|
| 3,897,146 | 7/1975 | Smith | 353/26 |
| 3,926,513 | 12/1975 | Silver et al. | 353/26 R |
| 3,941,978 | 3/1976 | Huston et al. | 353/26 A |
| 3,941,981 | 3/1976 | Abe et al. | 353/26 R |
| 3,999,846 | 12/1976 | Sone et al. | 353/26 A |
| 4,012,134 | 3/1977 | Silver et al. | 353/26 R |
| 4,028,552 | 6/1977 | Volk, Jr. | 353/26 A |
| 4,066,872 | 1/1978 | Karp et al. | 353/26 A |
| 4,119,372 | 10/1978 | Morgan | 353/26 R |
| 4,164,367 | 8/1979 | Wadleigh | 353/26 R |
| 4,174,890 | 11/1979 | Johnson et al. | 353/26 A |
| 4,351,591 | 9/1982 | Stockett | 353/26 R |
| 4,455,066 | 6/1984 | Olson et al. | 353/26 R |
| 4,456,201 | 6/1984 | Frias et al. | 353/26 R |
| 4,608,705 | 8/1986 | Tanaka | 353/26 A |
| 4,669,838 | 6/1987 | Hibbard | 353/26 A |
| 4,693,591 | 9/1987 | Saijo et al. | 353/26 R |
| 4,738,523 | 4/1988 | Ito et al. | 353/26 R |
| 4,752,124 | 6/1988 | Ueda et al. | 353/26 R |
| 4,755,046 | 7/1988 | Hirose et al. | 353/26 R |
| 4,855,789 | 8/1989 | Ogawa | 353/26 R |

FOREIGN PATENT DOCUMENTS

| | | | |
|---|---|---|---|
| 8103075 | 10/1981 | European Pat. Off. | 353/26 R |
| 8203698 | 10/1982 | European Pat. Off. | 353/26 R |
| 2813009 | 9/1978 | Fed. Rep. of Germany | 353/26 R |
| 0218930 | 9/1988 | Japan | 353/26 R |
| 0250630 | 10/1988 | Japan | 353/26 R |

Primary Examiner—William A. Cuchlinski, Jr.
Assistant Examiner—William C. Dowling
Attorney, Agent, or Firm—Fitzpatrick, Cella, Harper & Scinto

[57] ABSTRACT

A film feeding apparatus which feeds a film wound on a supply reel to a take-up means and rewinds the film on the supply reel, comprising: a driving shaft for removably receiving and holding the supply reel on which the film is wound and for rotating the reel; a driving means for rotating the driving shaft in a normal or reverse direction; a judging means for judging a rewinding direction of the film wound on the reel held by the driving shaft; and a control means for controlling the driving means to change a rotational direction of the driving shaft in response to the rewinding direction judged by the judging means, when the film is rewound.

17 Claims, 15 Drawing Sheets

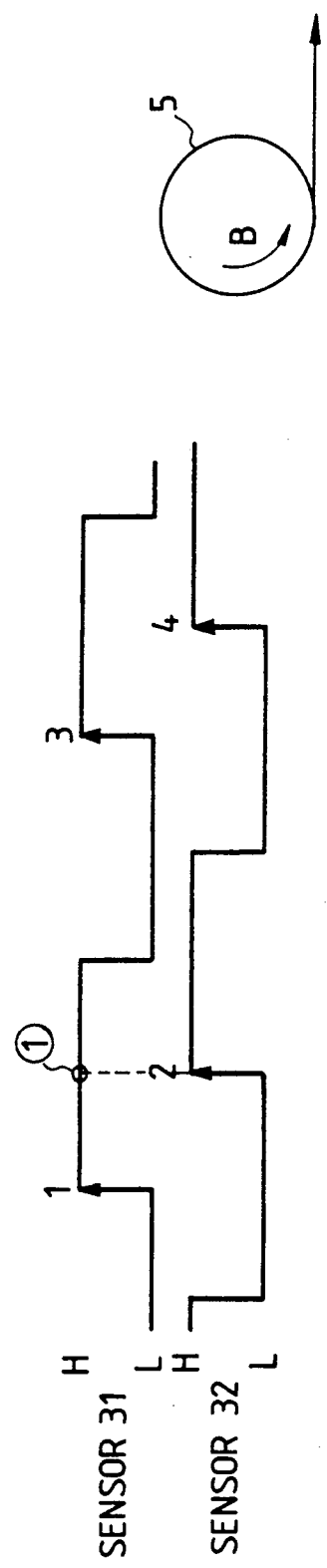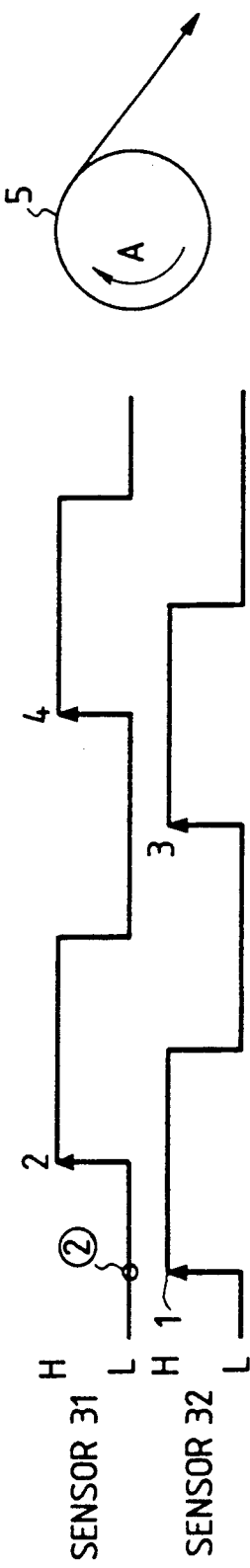

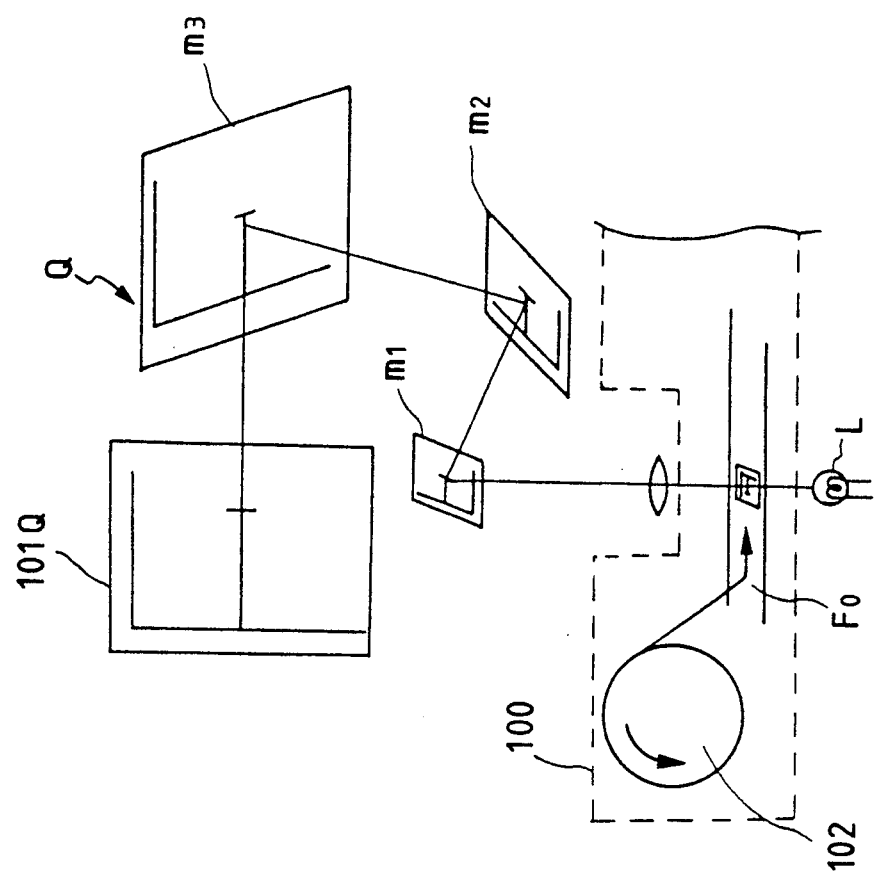
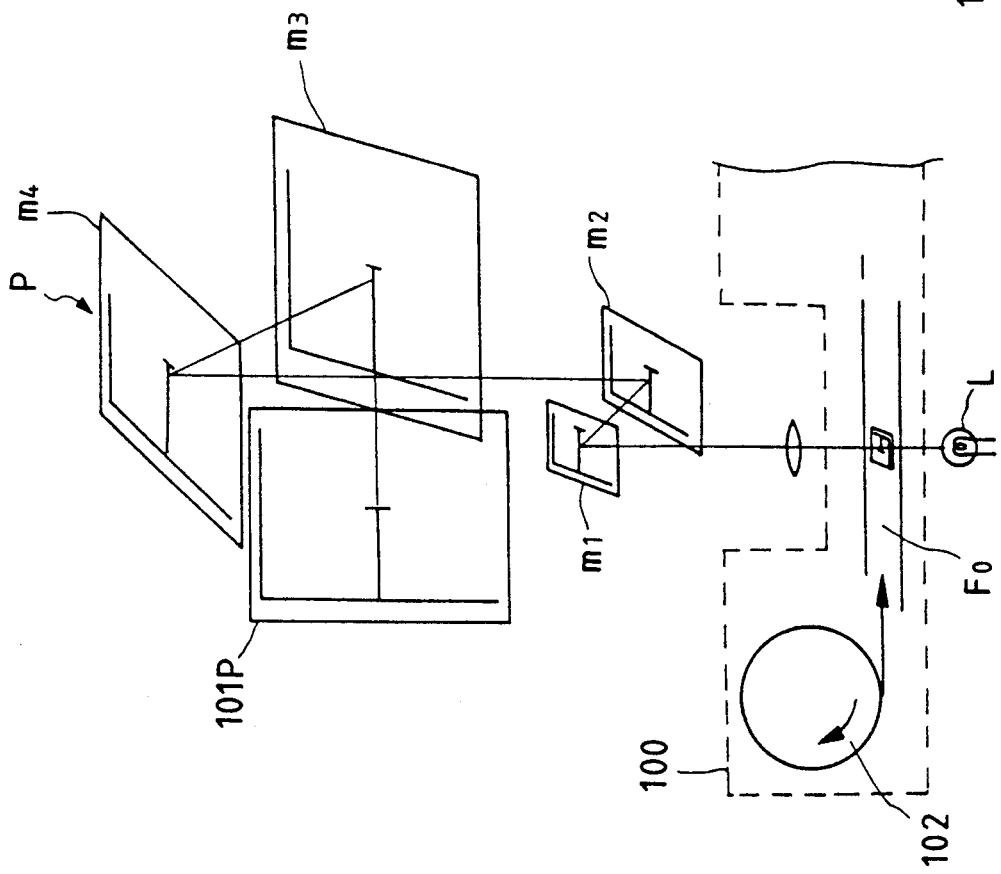

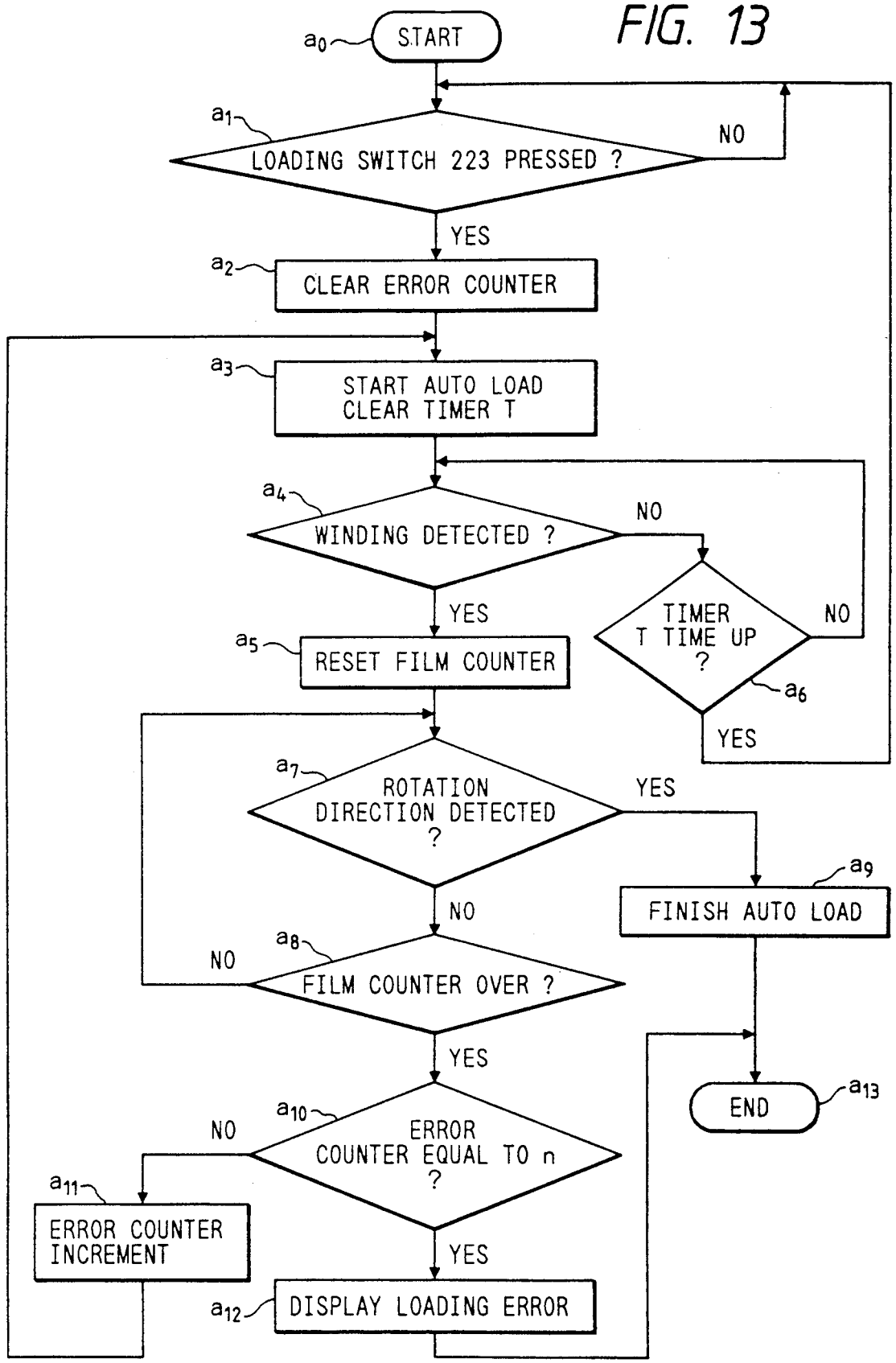

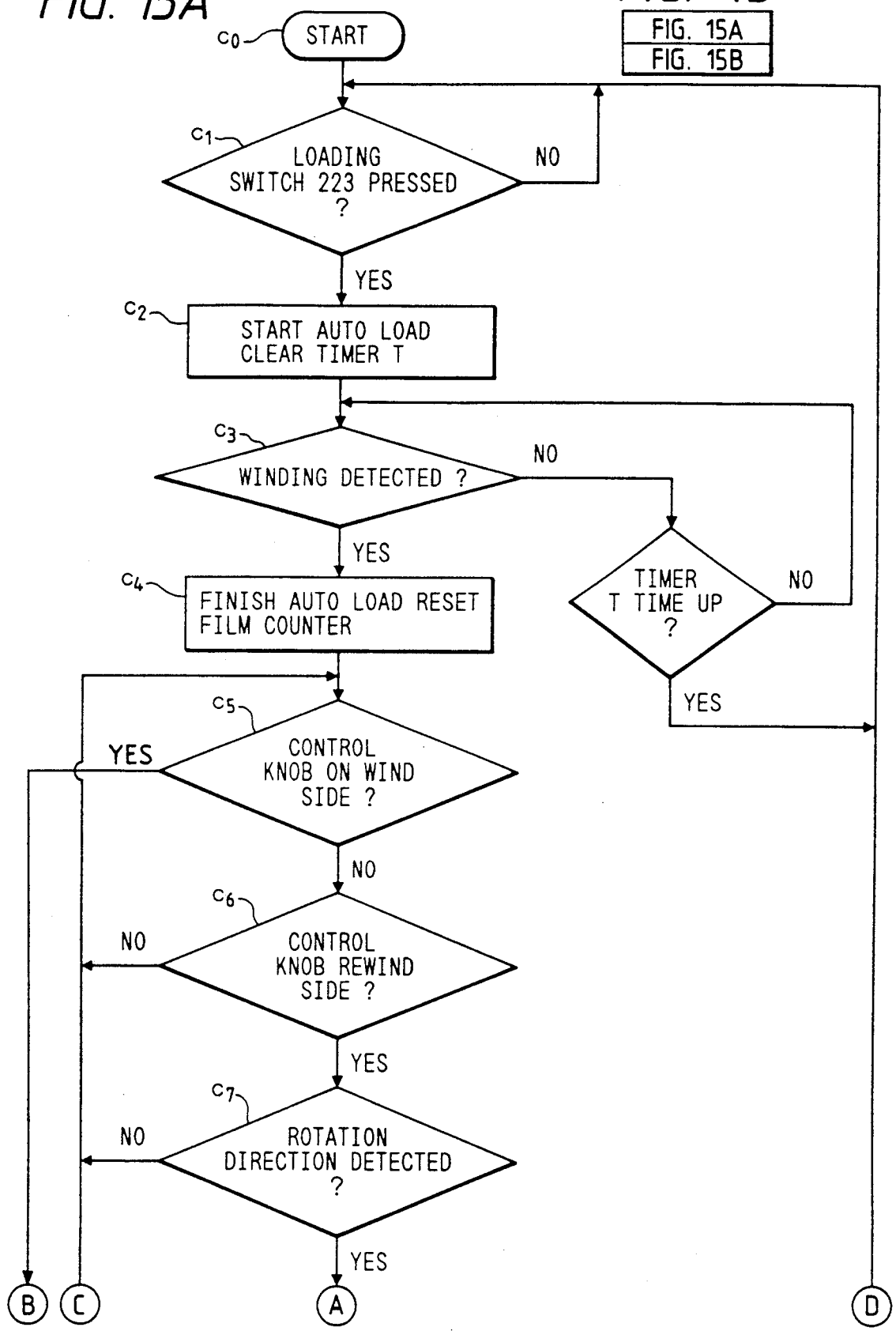

019b4c7c-e83c-4e78-8556-7810d76a1234
FILM FEEDING APPARATUS

BACKGROUND OF THE INVENTION

1. Field of the Invention

The present invention relates to a film feeding apparatus for feeding a film from a film roll on a supply reel to a take-up reel, and more particularly, it relates to such a film feeding apparatus applicable to various microfilm readers having different mirror arrangements.

2. Related Background Art

Up to the present, in microfilm readers or reader printers, because of the limitations of the size of the apparatus and/or the arrangement of optical elements, a bent optical path through which image light passes has been formed by using a plurality of mirrors. As such apparatuses, a reader P having a mirror arrangement comprising four (even) mirrors $m_1$-$m_4$ as shown in FIG. 12A and a reader Q having a mirror arrangement comprising three (odd) mirrors $m_1$-$m_3$ as shown in FIG. 12B have been known. In each of these readers, a film $F_o$ loaded within a film feeding apparatus is illuminated by a lamp L, to obtain a light image which is then projected onto a screen 101P or 101Q through the mirror arrangement $m_1$-$m_4$ or $m_1$-$m_3$ so that frame images on the film can be easily retrieved. Thereafter, the film $F_o$ is rewound on a reel 102 by rotating the latter by means of a motor. The film feeding apparatus 100 is so designed that it can be removably mounted on the reader, whereby the apparatus is applicable to various readers.

However, in the above-mentioned conventional arrangements, since the light image from the film $F_o$ is directed to the screen 101P or 101Q through the plurality of mirrors, the image projected on the screen 101P through the even number of mirrors is proportional to the image on the film, but, the image projected on the screen 101Q through the odd number of mirrors will be inverted with respect to the image on the film. Accordingly, in order to obtain the normal image projected on the screen 101P or 101Q both in the case of the reader P having four mirrors $m_1$-$m_4$ (FIG. 12A) and in the case of the reader Q having three mirrors $m_1$-$m_3$ (FIG. 12B), the film $F_o$ must be mounted on the reader Q with the surface of the film turned over.

In this case, in order to turn the film $F_o$ over at the illuminating position, i.e., in order to provide the back surface of the film at the illuminating position, the reel 102 on which the film $F_o$ is wound may be mounted on a supplying shaft of the film feeding apparatus 100 with the reel itself turned over. Accordingly, when the reel 102 on which the film is wound is applicable to the reader P having the even number of mirrors as it is, if the reel 102 is mounted on film feeding apparatus after it has been turned over, it is possible to project the normal image on the screen 101Q in the reader Q having the odd number of mirrors as shown in FIG. 12B.

However, in such a film feeding apparatus 100, since the reel 102 can be rotated only in a clockwise direction during the rewinding operation of the film, if the reel 102 is loaded with the turned-over condition as shown in FIG. 12B, the reel 102 cannot be rotated in an anti-clockwise direction, with the result that the film $F_o$ cannot be rewound. Therefore, such film feeding apparatus 100 cannot be applied to the reader having the odd number of mirrors. If the rewinding direction of the film is set to an opposite direction (i.e., anti-clockwise direction), such film feeding apparatus will not be applied to the reader having the even number of mirrors.

SUMMARY OF THE INVENTION

The present invention aims to eliminate the above-mentioned conventional drawbacks, and, therefore, an object of the present invention is to provide a film feeding apparatus which is applicable to readers having any mirror arrangements including not only the even number of mirrors but also the odd number of mirrors.

Another object of the present invention is to provide a film feeding apparatus wherein the feeding and rewinding of the film wound on a real can be performed positively.

In order to achieve the above objects, the present invention provides a film feeding apparatus wherein a film is fed out from a film roll wound on a removable reel and the film can be rewound on the reel by rotating the reel, comprising means for changing over the rotational direction of the reel when the film is rewound.

With the arrangement as mentioned above, in the present invention, when the film is rewound on the reel, the reel can be rotated either in a clockwise direction or in an anti-clockwise direction. Accordingly, even if the reel is loaded either with the normal condition or with the turned-over condition, the film can be rewound without fail.

BRIEF DESCRIPTION OF THE DRAWINGS

FIGS. 10 and 11 are timing charts showing outputs of photosensors of the apparatus according to the second embodiment, when the film is loaded on the apparatus;

FIGS. 12A and 12B are explanatory views showing the relation between an image on the film and an image projected on a screen, in readers having different mirror arrangements;

FIG. 13 is a flow chart showing an operation of a film feeding apparatus according to a third embodiment of the present invention;

DETAILED DESCRIPTION OF THE PREFERRED EMBODIMENTS

The present invention will now be explained in connection with embodiments thereof referring to the accompanying drawings.

Figure 1:
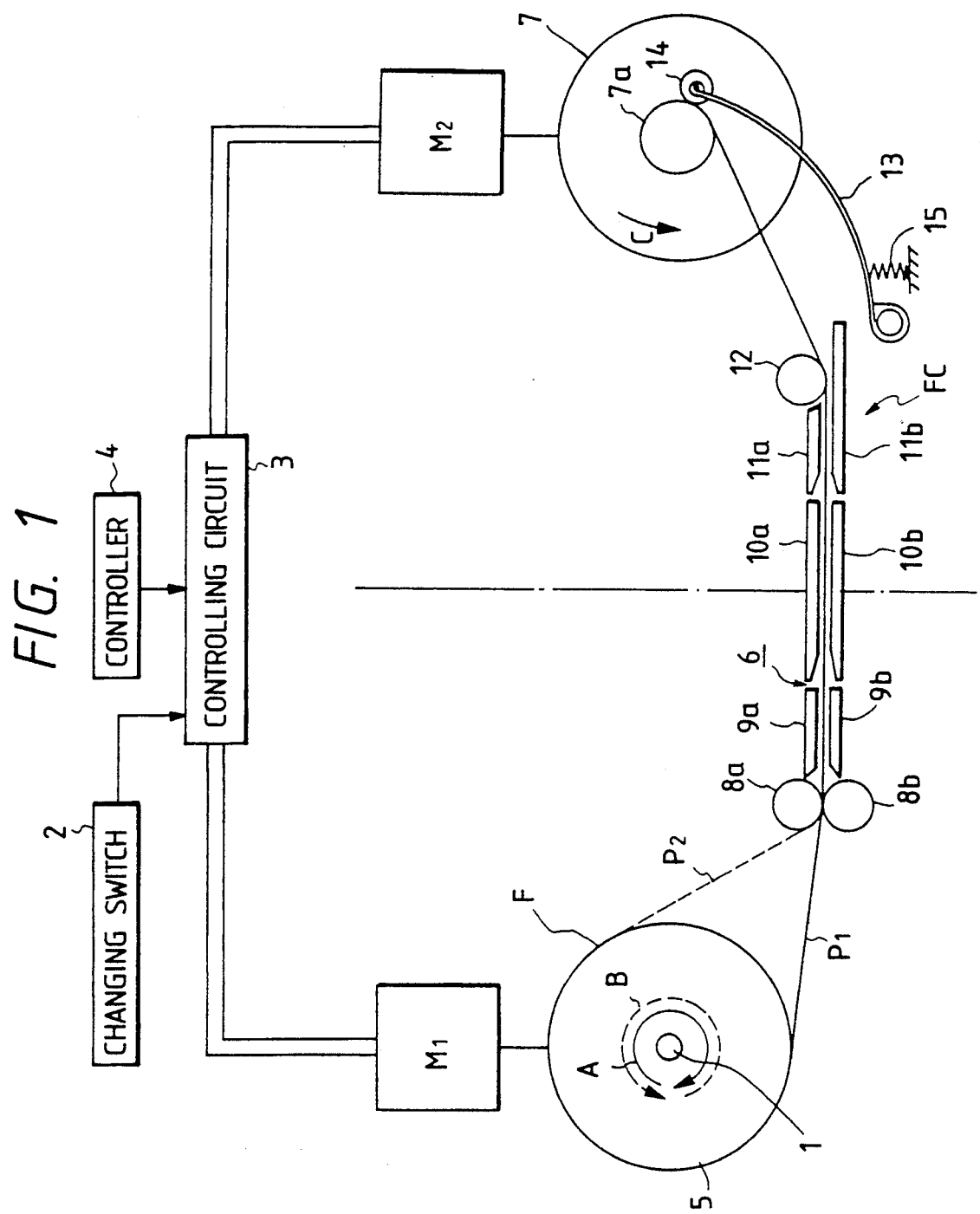
FIG. 1 is a schematic constructural view of a film feeding apparatus according to a preferred embodiment of the present invention.
Figure 2:
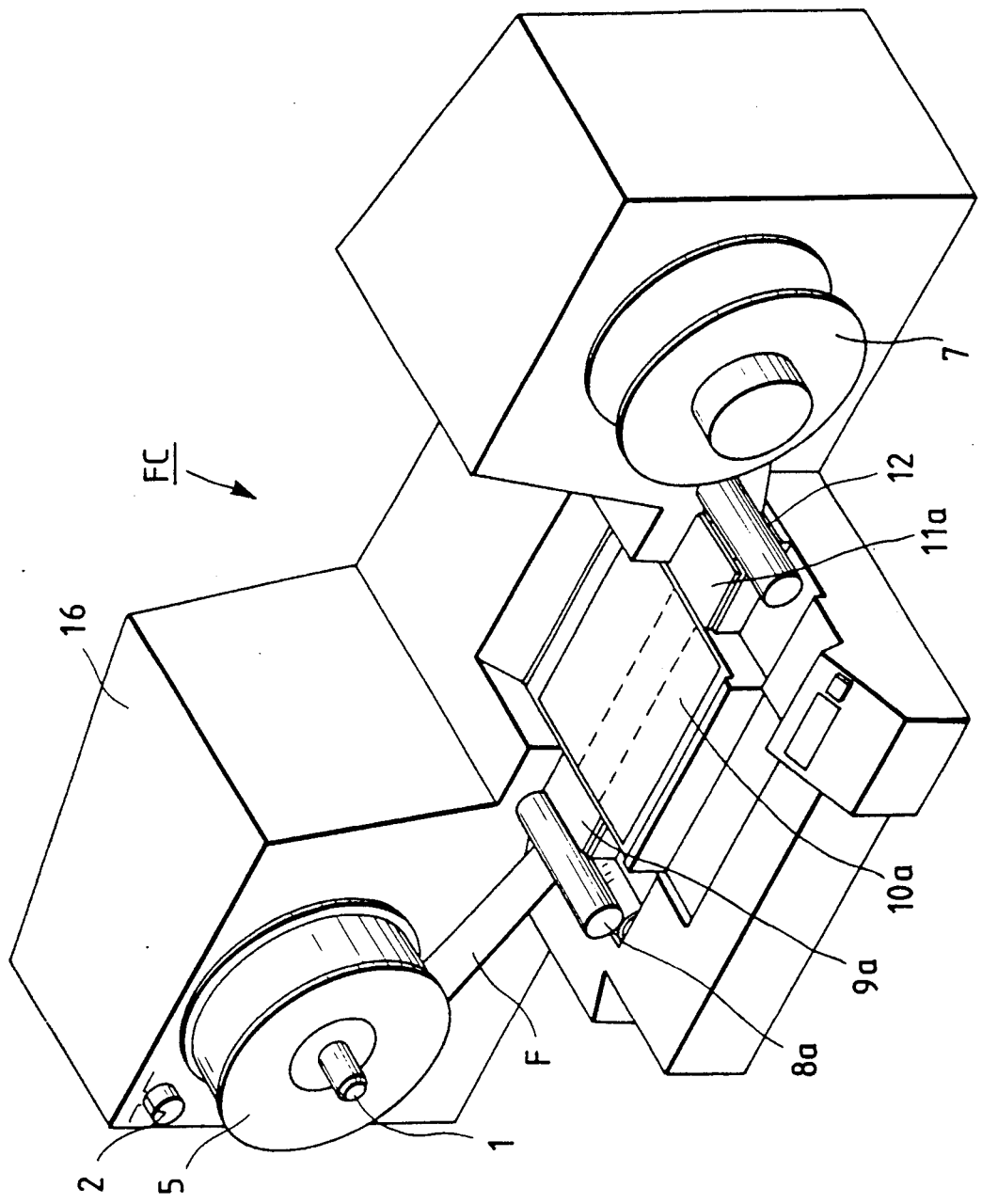
FIG. 2 is a perspective view of the film feeding apparatus of FIG. 1.

FIGS. 1 to 6 show a first embodiment of a film feeding apparatus according to the present invention, where FIG. 1 is a schematic constructional view and FIG. 2 is a perspective view of the apparatus.

In FIGS. 1 and 2, a supplying shaft 1 is connected to a supply motor $M_1$ and is rotatable in a direction A or B. The supply motor $M_1$ is arranged within a frame or housing 16 of the apparatus and is reversible so that the rotational direction of the motor can be changed over by actuating a changing switch 2 connected to a controlling circuit 3 arranged in the housing 16 of the apparatus. A controller 4 is connected to the controlling circuit 3, which controller serves to emit the command signals regarding the feeding of the film, winding of the film, rewinding of the film and the like.

A supply reel 5 on which a microfilm (refer to merely as "film" hereinafter) F is wound in a film roll can be loaded or mounted on the supplying shaft 1 and can be rotated together with the supplying shaft 1 in the direction A or B. Also, the supply reel 5 can be loaded on the supplying shaft 1 both from a front side and from a back side (i.e.,.both with a normal condition and with a turned-over condition).

At the right side (FIG. 1) of the supplying shaft 1, there is provided a feeding path 6 for guiding the film F, through which the film is directed to a take-up reel 7 arranged at the right side (FIG. 1) of the feeding path 6. The feeding path 6 is constituted by the following elements: a loading roller 8a for leading a leading edge of the film F to the feeding path 6, which roller is connected to a driving means (not shown); a guide roller 8b abutted against the loading roller 8a from the bottom; a pair of film guides 9a, 9b, a pair of film pressing glass plates 10a, 10b and a pair of film guides 11a, 11b arranged in order from the right of the paired rollers 8a, 8b; and a guide roller 12 arranged in the vicinity of the film guide 11a.

The take-up reel 7 is connected to a winding motor $M_2$ which is in turn connected to the controlling circuit 3. Further, the take-up reel 7 is adapted to be rotated in a direction C or D in response to a signal from the controller 4. Incidentally, the reference numeral 13 designates a guide arm for directing the film F to a core 7a of the take-up reel 7, which guide arm is provided at its free end with a rotatable guide roller 14 and is biased by a spring 15 to urge the guide roller 14 against the core 7a of the take-up reel 7.

Figure 3:
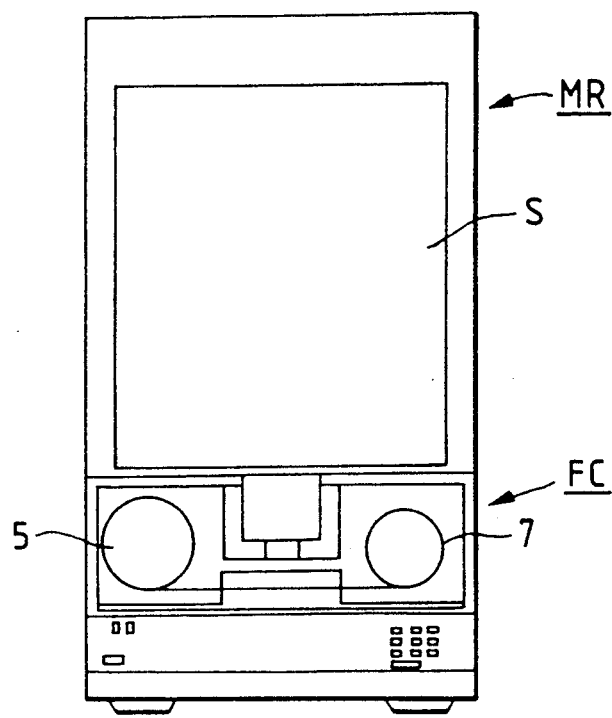
FIG. 3 is an elevational view of a microfilm reader to which the film feeding apparatus of FIG. 1 is applied.

FIG. 3 shows a microfilm reader MR to which the film feeding apparatus FC according to the first embodiment of the present invention is applied. The film feeding apparatus FC can be removably mounted on the microfilm reader MR at the front side thereof below a screen S. The film in the film feeding apparatus mounted on the microfilm reader is illuminated by a lamp (not shown) from the bottom, thus creating an enlarged light image on the screen S.

Figure 4:
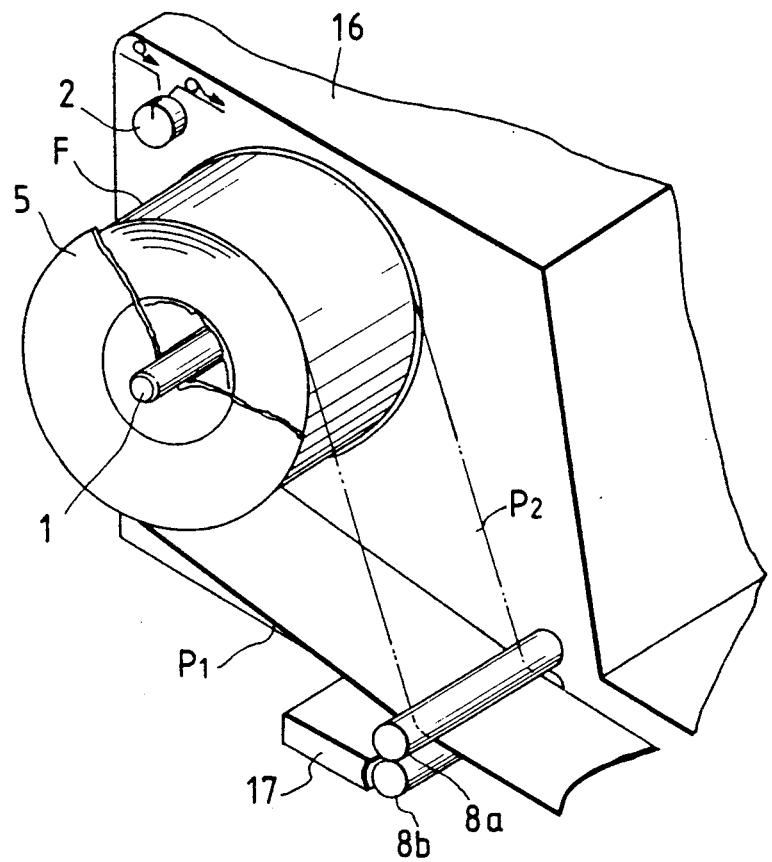
FIG. 4 is a partial enlarged perspective view of a film feeding portion of the film feeding apparatus of FIG. 1.

FIG. 4 shows the supply reel 5 in an enlarged scale. As mentioned above, the supply reel 5 can be loaded on the supplying shaft 1 both with the normal condition and with the turned-over condition. Accordingly, between the supply reel 5 and the loading roller 8a, a film path $P_1$ when the film F is fed out in an anti-clockwise direction or a film path $P_2$ when the film F is fed out in a clockwise direction can be formed or presented. Therefore, in the illustrated embodiment, in order not to obstruct the feeding or running of the film F, any members or elements such as a projection and the like are not situated in the vicinity of the film paths $P_1$, $P_2$.

Figure 5:
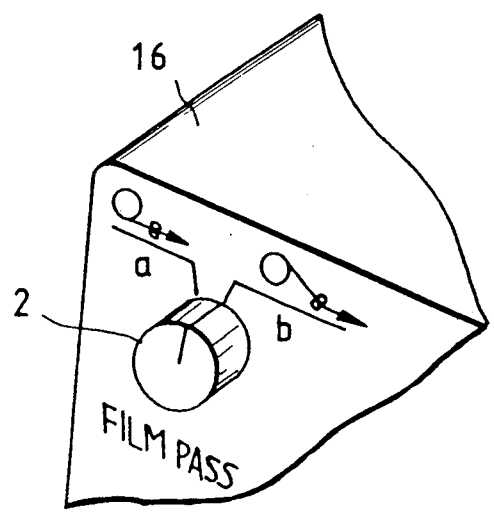
FIG. 5 is an enlarged perspective view showing a change over switch of the apparatus of FIG. 1.

The changing switch 2 is arranged in the vicinity of the supply reel 5. And, as shown in FIG. 5, by turning the changing switch 2 toward a direction (a or b) indicated by silhouettes or symbols representative of feeding directions of the film, the rotational direction of the supplying shaft 1 during the rewinding operation can be changed over. Incidentally, as shown in FIG. 4, a supporting member 17 is arranged in the vicinity of the guide roller 8b, for supporting the film F when the film F is loaded on the film feeding apparatus.

Figure 6:
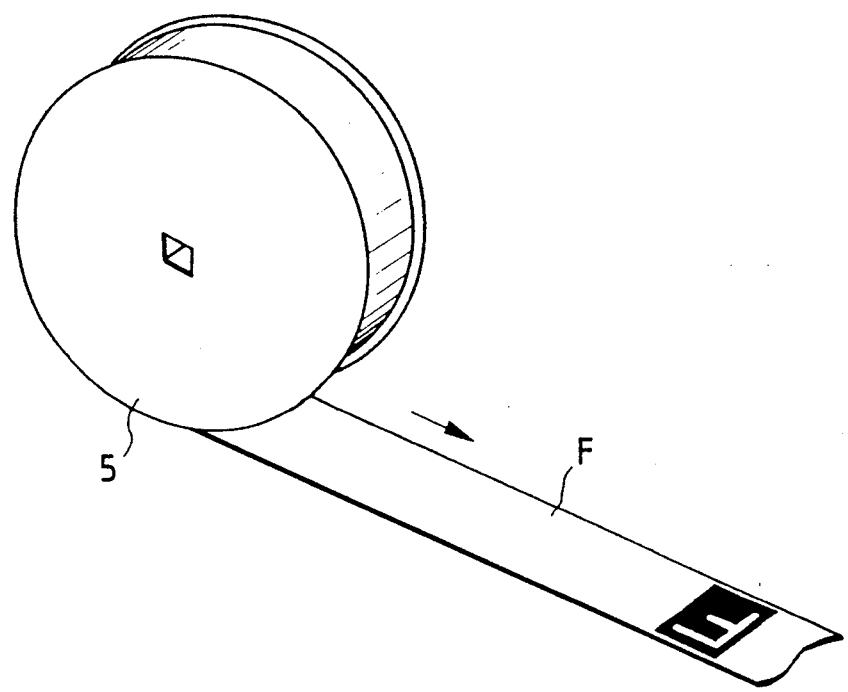
FIG. 6 is a perspective view showing a condition that a film is fed out from a reel.

With the arrangement as mentioned above, the feeding of the film F is performed as follows:

First of all, by turning or actuating the changing switch 2 in a desired direction, the setting direction of the film F, and accordingly the setting direction of the supply reel 5 is selected, and then the supply reel 5 is loaded in accordance with the setting direction thereof. In this case, for example, when the film feeding apparatus is applied to the microfilm reader having the even number of mirrors, as shown in FIG. 6, the supply reel 5 is loaded on the supplying shaft in such a manner that the film F is fed out in the anti-clockwise direction, whereby the back surface (including an inverted image) of the film F is illuminated by the lamp.

Then, the leading edge of the film F is inserted into the nip between the loading roller 8a and the guide roller 8b. Thereafter, by rotating the loading roller 8a, the film F is fed toward the take-up reel 7. When the leading edge of the film F reaches the core 7a of the take-up reel 7 along the guide arm 13, the take-up reel 7 is being rotated in the direction shown by the arrow C, and, therefore, the leading edge of the film F being urged against the core 7a of the take-up reel 7 by means of the guide roller 14 of the guide arm 13 is 20 wound around the core 7a. Thereafter, the supply reel 5 and the take-up reel 7 are driven and at the same time the lamp is energized, so that frame images on the film F are successively projected on the screen S, thus performing information retrieval, print or the like. After a predetermined operation has been completed, the film F is rewound by rotating the supply reel 5.

Figure 7:
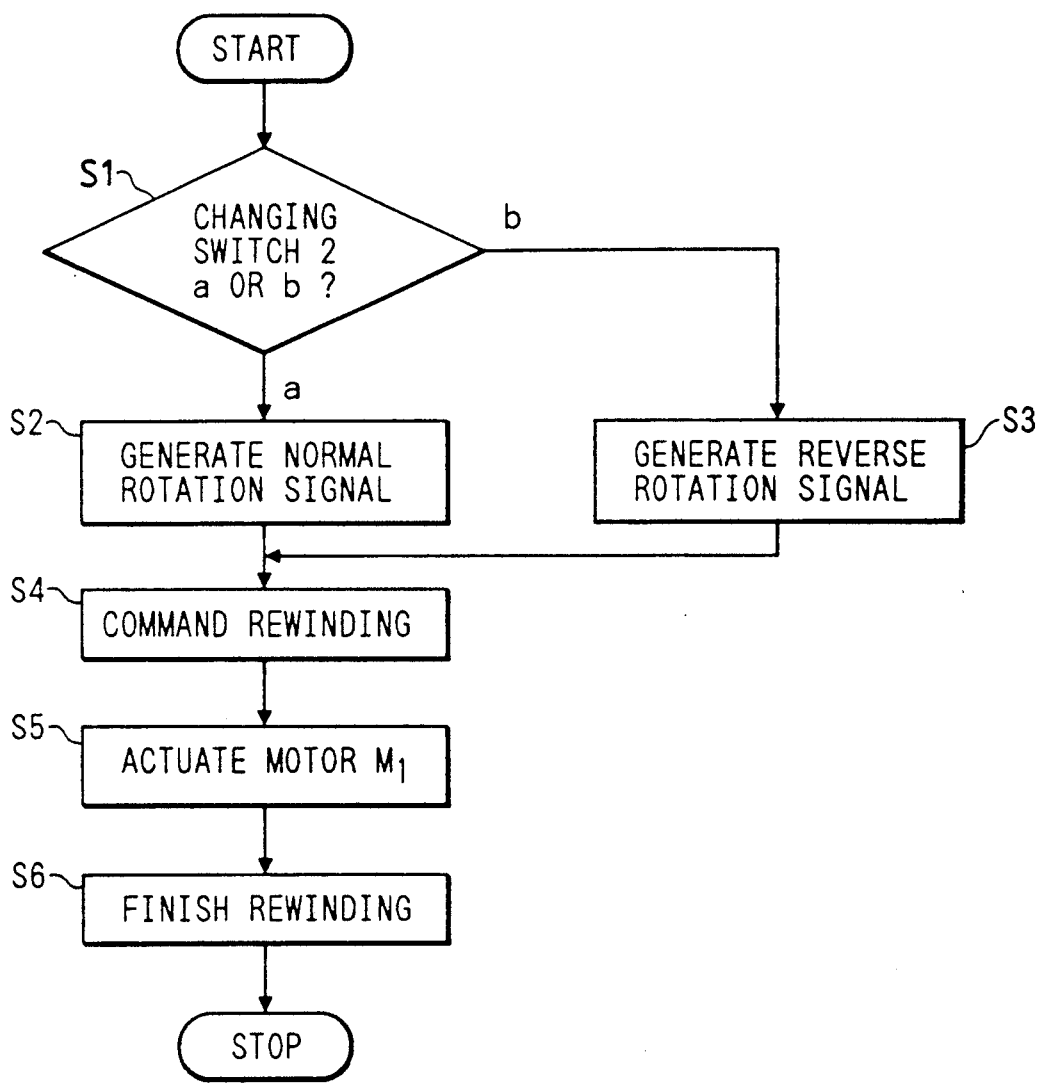
FIG. 7 is a flow chart showing a rewinding sequence regarding the apparatus of FIG. 1.
Figure 8:
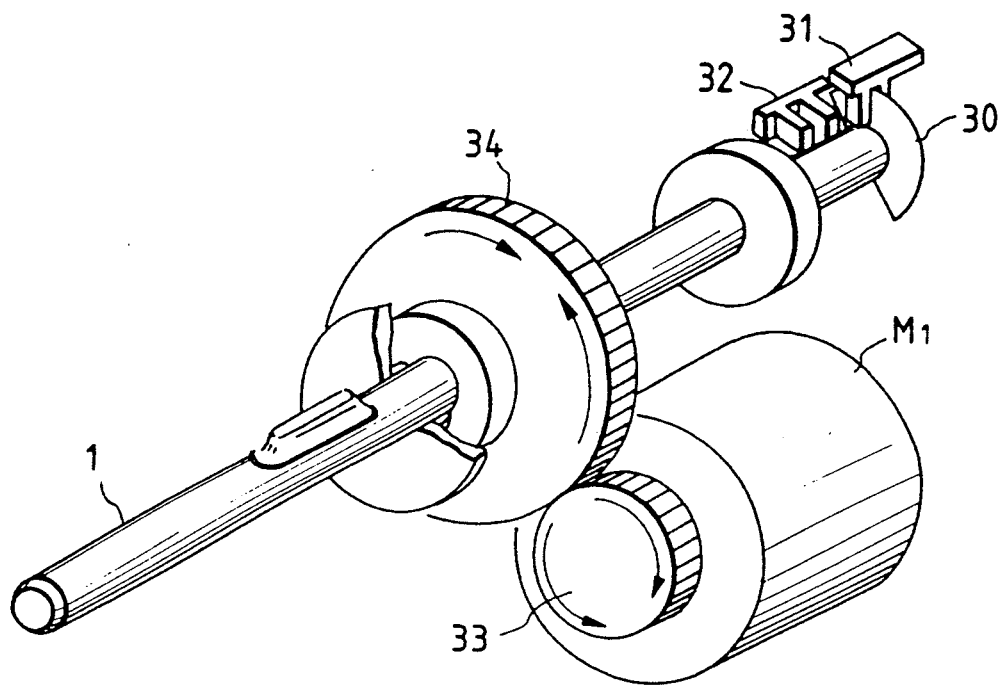
FIG. 8 is an enlarged perspective view showing a detecting portion for detecting the rotational direction of a supplying shaft, which is a main part of a film feeding apparatus according to a second embodiment of the present invention.

FIG. 7 shows a flow chart for executing the rewinding operation. As shown in FIG. 7, when the changing switch 2 is changed over to a or b in accordance with the number of mirrors in the reader (in a step S1), the changing switch 2 generates a normal rotation signal or a reverse rotation signal in accordance with the changed-over direction (in a step S2), which signals are sent to the controlling circuit 3. Then, when an operator manipulates the controller 4 to generate rewinding command (in a step S4), the motor $M_1$ is rotated in the direction in correspondence to the signal from the changing switch 2 (in a step S5). Thereafter, when the rewinding is finished (in a step S6), the motor $M_2$ is stopped. In this case, the rotational direction of the supplying shaft 1 corresponds to the direction shown by the arrow A when the film F passes through the film path $P_1$ (FIG. 1) and to the direction shown by the arrow B when the film passes through the film path $P_2$. Incidentally, the above-mentioned rewinding operation can be performed not only after the information retrieval and the like but also during the information retrieval and the like.

On the other hand, as to the loading direction of the supply reel 5, when the film feeding apparatus FC is applied to the microfilm reader having the odd number of mirrors, the supply reel 5 may be loaded on the supplying shaft 1 so that the surface of the film F including the inverted image faces toward the screen S (contrary to the case where the apparatus is applied to the reader having the even number of mirrors). In this case, the winding operation may be performed in the same manner on the basis of the flow chart of FIG. 7.

As mentioned above, according to the illustrated embodiment, even if the film F is fed out from the supply reel 5 either in the clockwise direction or in the anti-clockwise direction, the film can be rewound without fail, and, accordingly, it is possible to easily create the normal image on the screen S of the readers or reader printers having any mirror arrangements (any numbers of mirrors). As a result, even when the film is inversely wound on the supply reel for application to the readers having different number of mirrors is used, it is possible to create the normal image on the screen of such readers.

FIGS. 8 to 11 show a second embodiment of the present invention, wherein the loading direction of the film F can automatically be discriminated or judged. The same elements as those in the first embodiment will be designated by the same reference numerals as those in the first embodiment. In the second embodiment, a semi-circular vane or plate 30 is attached to a supplying shaft 1 which is driven by a supply motor $M_1$ through gears 33, 34. An out-of-phase encoder is formed by detecting the vane 30 at different circumferential positions by means of two photosensors 31 and 32.

Figure 9:
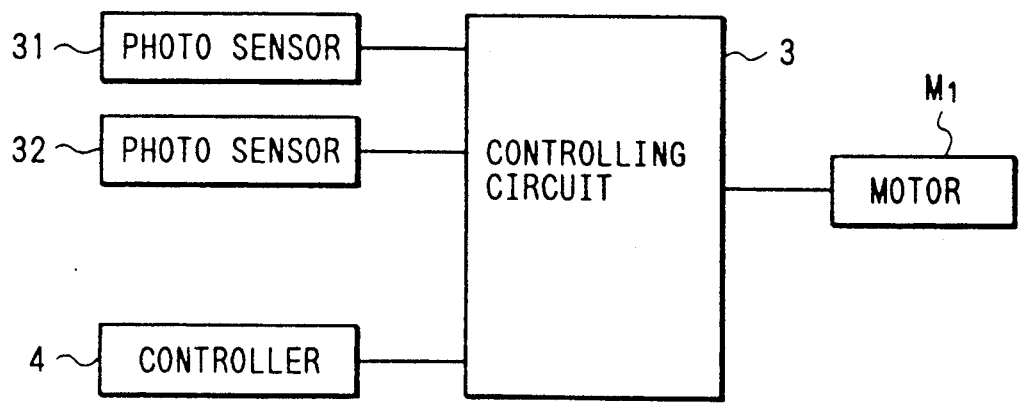
FIG. 9 is a block diagram showing a main controlling portion of the apparatus according to the second embodiment.

As shown in FIG. 9, these photosensors 31, 32 are connected to the controlling circuit 3, and the motor $M_1$ for rotating the supplying shaft 1 is driven on the basis of detection signals obtained from the photosensors 31, 32.

In the second embodiment, when the film is rewound, in place of the manual changing-over operation of the previous embodiment (the step S1 in FIG. 7), an automatic changing-over operation is effected in the following procedures:

FIGS. 10 and 11 show outputs of the photosensors 31, 32 when the supply reel 5 is loaded so that the film F is fed out in the anti-clockwise direction or in the clockwise direction, respectively. In FIGS. 10 and 11, an H level of a signal represents a condition that the vane 30 is detected by the sensor 31 or 32, and an L level of the signal represents a condition that the vane 30 is not detected by the sensors 31, 32. By comparing these signals as follows, the rotational direction of the supplying shaft 1 can be detected, whereby the loading direction of the film F, i.e., the rotational direction of the reel to rewind the film on the supply reel 5 can be judged.

For example, when the supply reel 5 is loaded so that the film F is fed out in the anti-clockwise direction, the supplying shaft 1 is rotated in direction B while the film F is being fed toward the take-up reel 7 by means of the loading roller 8a. In this case, when the vane 30 is begun to be detected by the photosensor 32, since the vane 30 has always been detected by the photosensor 31, as shown in FIG. 10, when the output of the photosensor 32 begins to change to the H level, the output of the photosensor 31 has already become H level (see point I in FIG. 10).

On the other hand, when the supply reel 5 is loaded so that the film F is fed out in the clockwise direction and the supplying shaft 1 is rotated in the direction A, as shown in FIG. 11, when the output of the photosensor 32 begins to change to the H level, the output of the photosensor 31 remains in the L level condition (see point II in FIG. 10). Accordingly, by previously storing such relations of these outputs, it is possible to easily judge the loading direction of the film F, and, therefore, it is possible to rewind the film even if it is wound on the supply reel either in the clockwise direction or in the anti-clockwise direction, by rotating the motor $M_1$ in the predetermined direction on the basis of the judged result when the film F is rewound on the supply reel 5.

That is to say, according to the second embodiment, the changing over operation for rewinding the film can be omitted, thus improving the working efficiency.

Incidentally, although the setting of the outputs of the photosensors and/or the method for judging the rotational direction of the supplying shaft 1 are not limited to the above mentioned ones, according to the second embodiment, it is possible to judge the loading direction of the film F very easily. The other constructions and operations of the film feeding apparatus of the second embodiment are the same as those of the first embodiment, and, thus, the explanation thereof will be omitted.

In the present invention having the construction and operation as mentioned above, since there is provided the means for changing over the rotational direction of the reel when the film is rewound, the film rewinding operation can be effectively performed without fail, even when the supply reel is loaded either in the normal direction or in the turned-over direction, and thus, the film feeding apparatus can be applied to any microfilm readers or reader printers having different mirror arrangements (even or odd) to obtain the normal image on the screen of the readers and the like.

Next, a further embodiment of a film feeding apparatus will be explained with reference to FIGS. 16 to 19.

Figure 16:
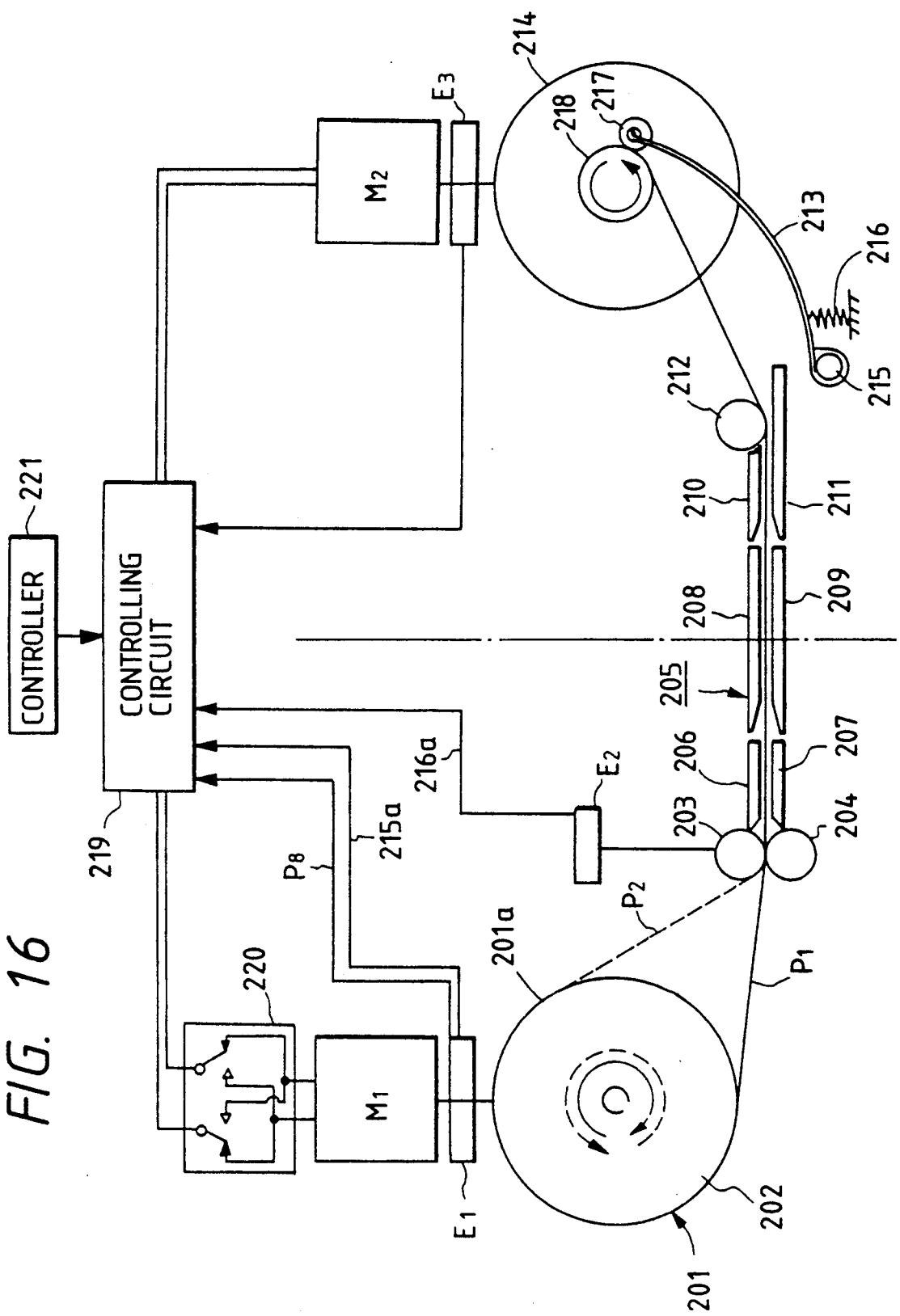
FIG. 16 is a schematic whole constructional view of a film feeding apparatus according to the present invention.

FIG. 16 is a schematic plan view of the film feeding apparatus. A roll film F is loaded on a supplying shaft 202 of the apparatus with the film wound on a supply reel 201. The film may be loaded so that the film F is fed out in an anti-clockwise direction or clockwise direction. In the former case, a film path $P_1$ shown by a solid line in FIG. 16 is created, whereas, in the latter case, a film path $P_2$ shown by a broken line is created. A leading edge of the film F so fed is directed to the nip between a loading roller 203 and a guide roller 204 urged against the loading roller, and then is fed in a feeding path 205. The feeding path 205 is defined by a pair of film guides 206, 207, a pair of film pressing glass plates 208, 209 and a pair of film guides 210, 211. On the other end of the feeding path 205, a guide roller 212 and a guide arm 213 are arranged for guiding the leading edge of the film F passed through the feeding path 205 toward a take-up reel 214. The guide arm 213 is biased by means of a spring 216 to rotate around an end 215 thereof toward the take-up reel 214 so that a guide roller 217 arranged on a free end of the guide arm 213 is urged against a core 218 of the take-up reel 214. The guide arm 213 has a gentle curved configuration from an outlet of the feeding path 205 to the guide roller 217. The leading edge of the film F is guided along the gentle curvature to the nip between the guide roller 217 and the core 218.

The supplying shaft 202 is adapted to be rotated in a clockwise direction and an anti-clockwise direction by means of a supply motor $M_1$. The take-up reel 214 is adapted to be rotated at least in an anti-clockwise direction by means of a take-up motor $M_2$. The loading roller 203 can be driven by a loading motor (not shown) or the supply motor $M_1$ or the take-up motor $M_2$ through an appropriate driving mechanism (not shown).

Further, an encoder $E_1$ is arranged on the supplying shaft 202, an encoder $E_2$ is arranged on a rotary shaft of the loading roller 203, and an encoder $E_3$ is arranged on a take-up shaft of the take-up reel 214. These encoders are connected to a controlling circuit 219 to detect the rotational amount and rotational direction of the respective shafts.

Incidentally, a change-over circuit 220 for changing over the clockwise rotation and anti-clockwise rotation of the supply motor $M_1$ is associated with the supply motor $M_1$, which change over circuit is connected to the controlling circuit 219. The controlling circuit 219 is controlled by a controller 221.

Figure 17:
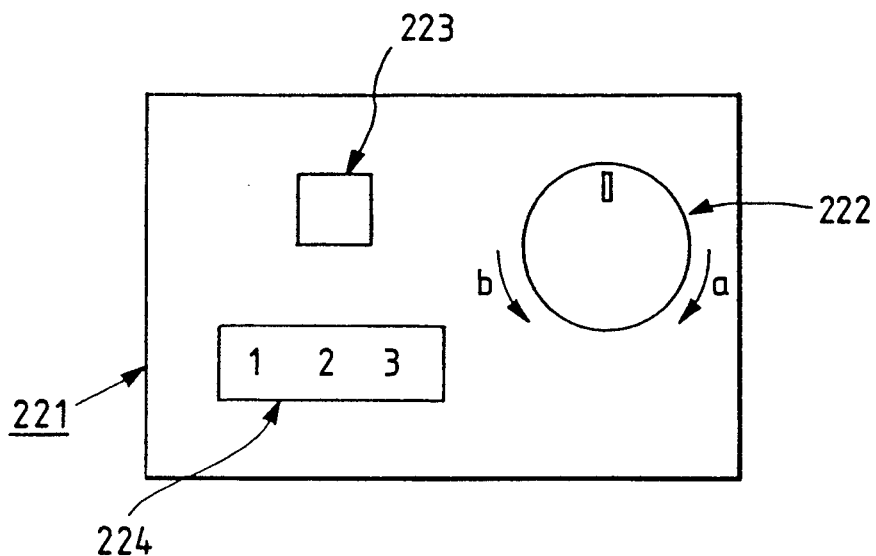
FIG. 17 shows details of a controller of the apparatus of FIG. 16.

As shown in FIG. 17, the controller 221 includes a control knob 222 for indicating or determining the feeding direction and feeding speed of the film F in the feeding path 205, a semi-auto loading start switch 223 for effecting the automatic loading operation that the leading edge of the roll film F is fed in the feeding path 205 and then is wound around the take-up reel 214, and a displayer 224 for displaying a feeding amount of the film and the like.

Next, an operation of the film feeding apparatus according to the third embodiment will be explained.

First of all, the roll film F wound around the supply reel 210 is loaded on the supplying shaft 202 of the apparatus. As mentioned above, the loading direction of the film may be selected among two ways (to create the film path $P_1$ or $P_2$). Then, the leading edge of the film F is manually inserted between the loading roller 203 and the guide roller 204, and thereafter, by turning the semi-auto loading switch 223 ON, the loading roller 203 is rotated to feed the leading edge of the film F into the feeding path 205. Of course, if means is provided for automatically inserting the leading edge of the film between the loading roller 203 and the guide roller 204, the above-mentioned successive operations can be performed automatically by actuating the start switch 223.

Figure 18A:
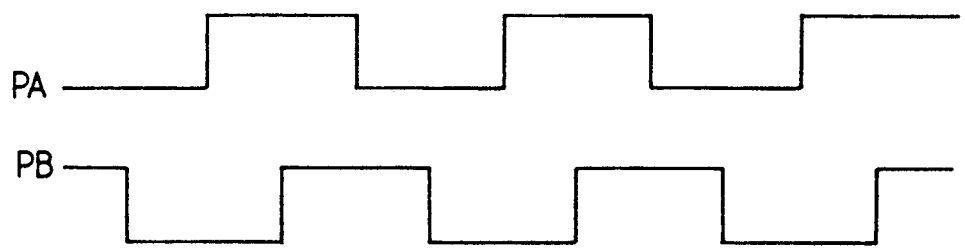
FIGS. 18A and 18B are timing charts showing pulse waves emitted from an encoder of the apparatus of FIG. 16.
Figure 18B:
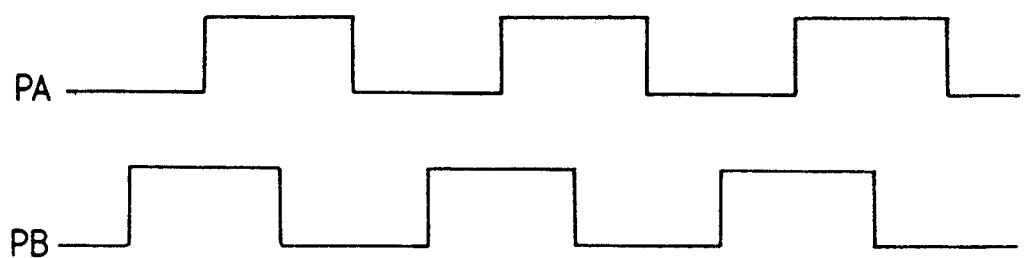
Figure 19:
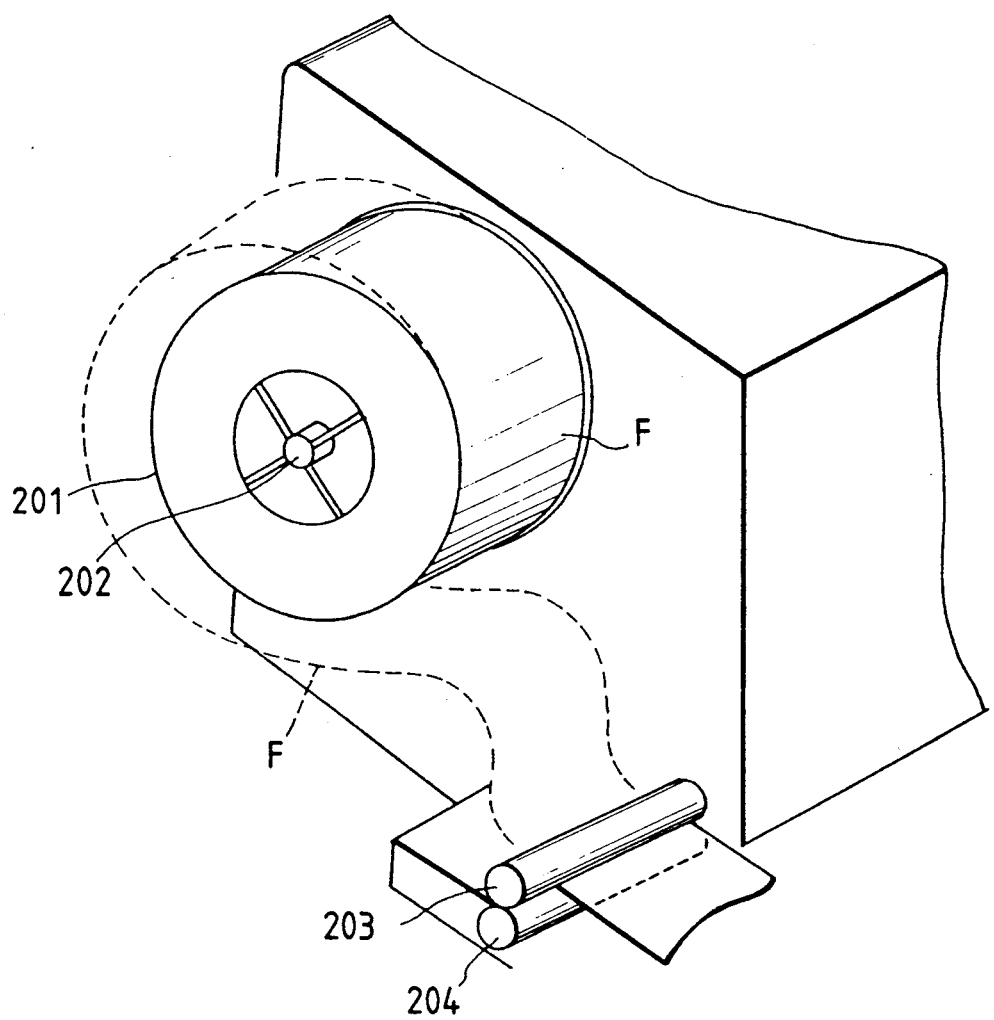
FIG. 19 is an enlarged partial perspective view showing a supply reel for explaining a problem of the apparatus of FIG. 16.

The leading edge of the film F introduced into the feeding path 205 is then fed between the core 218 of the take-up reel 214 and the guide roller 217, thus automatically winding the film on the take-up reel 214. Meanwhile, the supply reel 5 is rotated by a pulling force of the film being fed. In this way, the encoder $E_1$ arranged on the supplying shaft 202 detects the rotational direction of the supply reel 210. The detection of the rotational direction by means of the encoder $E_1$ is effected by sending two kinds of pulses PA, PB emitted from the encoder $E_1$ to the controlling circuit 219. That is to say, when the supply reel is rotated in the clockwise direction, as shown in FIG. 18A, one of the pulses PB is out-of phase by 90 degrees with respect to the other pulse PA. On the other hand, when the supply reel is rotated in the anti-clockwise direction, as shown in FIG. 18B, the pulse PB is out of phase by 270 degrees with respect to the other pulse PA. On the basis of the difference between the out-of-phases, the detection of the rotational direction of the supply reel is performed.

After the automatic loading of the film has been completed with the detection of the rotational direction of the supply reel, when the film is fed to either direction (left or right in FIG. 16) in the feeding path, the direction to which the switch of the change-over circuit 220 of the supply motor M, is changed is determined. Incidentally, when the leading edge of the film F begins to be wound around the take-up reel 214, the latter has already been rotated in a taking-up direction (anti-clockwise direction in FIG. 16).

Then, on the basis of the ratio between the number of revolutions of the loading roller 203 detected by the encoder $E_2$ and the number of revolutions of the take-up reel 214 detected by the encoder $E_3$, the fact that the leading edge of the film F is wound around the take-up reel 214 is detected. That is to say, since the ratio between the radius of the loading roller and the radius of the core 218 of the take-up reel 214 is constant, the ratio between the amount of rotation of the loading roller 203 and the amount of rotation of the core 218 will be a given constant value at the moment when the leading edge of the film F begins to be wound around the core 218. Accordingly, by continuously measuring the ratio $e_2/e_3$ between the number $e_2$ of pulses from the encoder $E_2$ representative of the number of revolutions of the loading roller and the number $e_3$ of pulses from the encoder $E_3$ representative of the number of revolutions of the take-up reel 214, when such ratio reaches the given constant value, it is judged that the winding of the film onto the take-up reel is started. Incidentally, since the take-up reel 214 is rotated slightly faster than the feeding speed of the leading edge of the film, such pulse ratio $e_2/e_3$ before the winding of the film is started will be larger than that after the winding of the film has been started. When the winding of the film is detected, the semi-auto loading operation is completed.

Thereafter, by rotating or turning the control knob 222 of the controller 221 shown in FIG. 17, the film F is fed to any direction (left or right in FIG. 16) in the feeding path 205. Incidentally, the displayer 224 of the controller 221 displays the odometer count in proportion to the output of the encoder $E_2$.

Next, the sequence regarding the controller 221 shown in FIG. 16 will be explained with reference to a flow chart of FIG. 13.

First of all, it is judged whether the semi-auto loading start switch 223 is depressed or not (in step $a_1$); if yes, then the semi-auto loading operation is initiated. That is to say, a loading error counter is cleared (in step $a_2$), and then the timer T is cleared and the auto load is started, thus rotating the loading roller 203 and the take-up reel 214, and the semi-auto loading operation is started (in step $a_3$). Due to the rotation of the loading roller 203, the leading edge of the film F is fed out into the feeding path 205 and then is guided between the core 218 of the take-up reel 214 and the guide roller 217. Now, as mentioned above, on the basis of the pulse ratio $e_2/e_3$ between the number of pulses from the encoder $E_2$ regarding the loading roller 203 and the number of pulses from the encoder $E_3$ regarding the take-up reel, the winding of the leading edge of the film F onto the take-up reel 214 is detected (in step $a_4$). When the winding of the film is not detected, it is judged whether the timer T is timed up (in step $a_6$); if yes, it is judged that the semi-auto loading operation is in error or the semi-auto loading start switch is erroneously depressed. In this case, the sequence returns to step $a_1$, thus waiting for the re-depression of the semi-auto loading start switch 223. On the other hand, if the timer T is not timed up, the sequence returns to step $a_4$, where the detection for the winding of the film is continued.

Next, when the winding of the film is detected in step $a_4$, a film counter operated in synchronism with the feeding amount of the film is reset (in step $a_5$), and it is judged whether the detection for the loading direction of the roll film, i.e., the rotational direction of the supply reel is performed or not (in step $a_7$). That is to say, as mentioned above, the roll film wound on the supply reel can be loaded in two ways (to create the film path $P_1$ or $P_2$ in FIG. 16), and, thus, the rotational direction of the supplying shaft 202 must be determined on the basis of such difference in loading directions by means of the change-over circuit 220. More particularly, when the film is fed out along the film path $P_2$ (FIG. 16), the supply reel 201 is rotated in the anti-clockwise direction; whereas, when the film is fed out along the film path $P_1$, the supply reel 201 is rotated in the clockwise direction. The detection for such rotational direction of the supply reel is performed by detecting the out-of-phase of the pulses emitted from the encoders as previously explained in connection with FIGS. 18A and 18B. When the rotational direction is detected, the auto load is finished (in step $a_9$), thus ending the program (in step $a_{13}$).

In step $a_7$, when the rotational direction is not yet detected, it is judged whether the film counter is over or exceeds a predetermined value (in step $a_8$); if yes, it is judged whether the error counter reaches a predetermined value n (in step $a_{10}$). When the value in the error counter is above the value n, the semi-auto loading operation is stopped as assumed that the predetermined time duration has been elapsed, thereby displaying error indication (Err) on the displayer 224 of the controller 221 (in step $a_{12}$). On the other hand, in step $a_{10}$, when the value in the error counter does not reach the predetermined value n, the increment in the error counter is effected (in step $a_{11}$), then returning the sequence to step $a_3$, where the semi-auto loading operation is started again. In this way, by repeating the semi-auto loading operations, the detection operations for the loading direction of the roll film are repeated at predetermined time intervals.

By repeating such semi-auto loading operations, since it can be considered that the leading edge of the film F has already been wound on the take-up reel 214 and that the film continues to be fed, it is anticipated that the supply reel 201 will soon be rotated in either direction. Accordingly, by repeating the semi-auto loading operations for a predetermined time, it is anticipated that the rotational direction will soon be detected. Consequently, it will not be needed to load roll film on the apparatus again and/or to depress the semi-auto loading start switch 223 again.

Incidentally, in the above third embodiment, while an example that the semi-auto loading operations are repeated (i.e., if the loading direction is not detected even after the detection operations for detecting the rotational direction at the predetermined time intervals have been repeated for the predetermined time, the sequence returns to step $a_3$) was explained, as other embodiment, the step ($a_4$) and the like for detecting the winding of the film may be omitted in the repeated sequence. A fourth embodiment including such omission will be explained in connection with a flow chart shown in FIG. 14.

Figure 14:
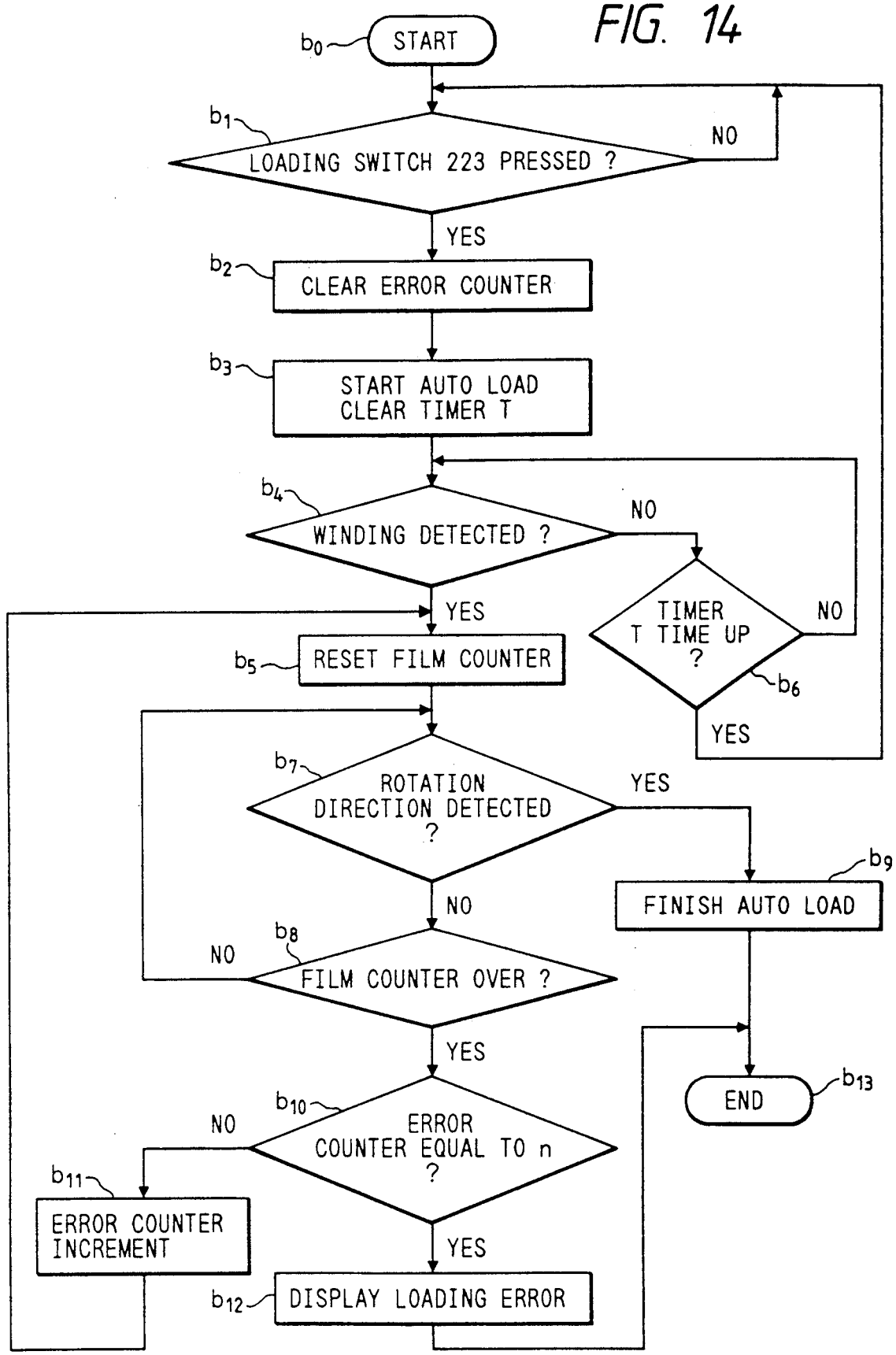
FIG. 14 is a flow chart showing an operation of film feeding apparatus according to a fourth embodiment of the present invention.

In FIG. 14, the sequence includes steps $b_1-b_{10}$, $b_{12}$, $b_{13}$ corresponding to and same as the steps $a_1-a_{10}$, $a_{12}$, $a_{13}$ of the third embodiment, respectively. However, a step $b_{11}$ is returned to the step $b_5$, thus omitting or bypassing the steps $b_3$ and $b_4$ in the repeated sequence. This is the reason why the leading edge of the film has already been detected, and thus the re-detection of the leading edge is not needed. Also in this fourth embodiment, the detection operations at the predetermined time intervals (step $b_8$) are repeated for the time (step $b_{10}$), thereby obtaining the same effects as the third embodiment and further improving the working efficiency.

Figure 15B:
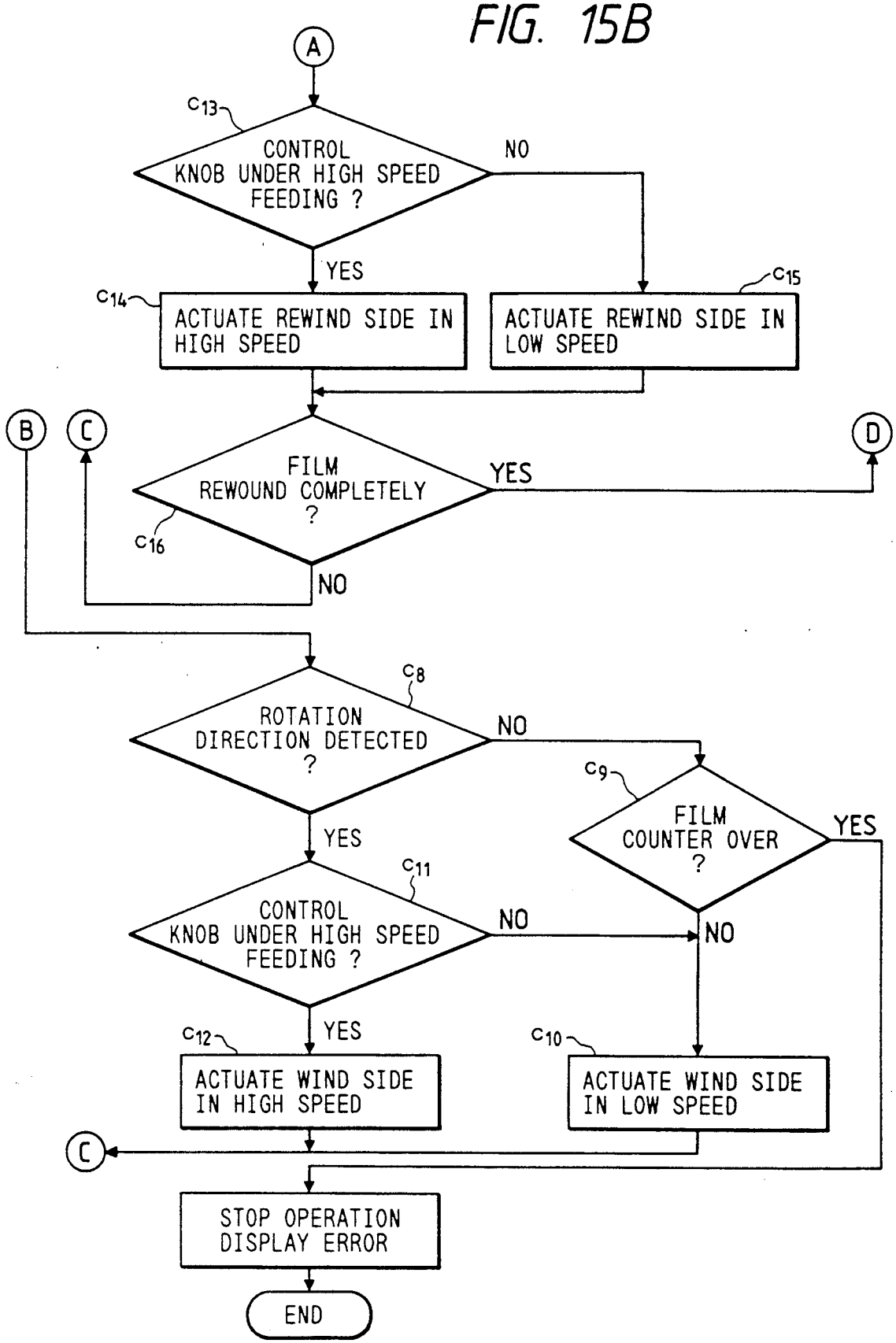
FIG. 15 is a flow chart showing an operation of a film feeding apparatus according to a fifth embodiment of the present invention.

In the third and fourth embodiments, the loading roller 203 and the take-up reel 214 were rotated the same as when the rotational direction of the normal supply reel 201 was correctly detected. However, in consideration of the fact that the recent film feeding apparatuses are operated at a higher speed and therefore these elements (loading roller and take-up reel) are also rotated at a high speed, if there is a slack in the film, the stress exerted to the film when the leading edge of the film is wound around the take-up reel will increase to damage the film. To avoid this in a fifth embodiment of the present invention, as shown in a flow chart of FIG. 15, the take-up motor $M_2$ is controlled to rotate at a lower speed.

More particularly, it is judged whether the semi-auto loading start switch 223 is depressed or not (in step $c_1$); if yes, the auto load is started and the timer T is cleared (in step $c_2$). Then, it is judged whether the winding of the leading edge of the film is detected or not (in step $c_3$); if yes the semi-auto loading operation is finished once, and the film counter is reset (in step $c_4$). Next, when the film control knob 222 (see FIG. 17) is rotated toward the film winding direction $\underline{a}$ to initiate the rotation for the film retrieval, in response to the signal from the film control knob 222, the controlling circuit 219 drives the take-up motor $M_2$ at a low speed (in steps $c_5-c_{10}$) That is to say, in this case, it is judged whether the control knob 222 is turned toward the wind side (step $c_5$); if yes, it is judged whether the rotational direction of the supply reel has been detected (step $c_8$). If the rotational direction has not yet been detected, it is judged whether the film counter is over or not (step $c_9$); if not, the take-up motor $M_2$ is rotated at a first low speed (step $c_{10}$).

By rotating the take-up motor at such low speed, it is possible to prevent the great stress generated due to the slack in the film from acting on the film. As the take-up motor is rotated at the low speed, the slack in the film F is eliminated to rotate the supply reel 201. At that time, the sequence returns to the step $c_5$, where the detection of through rotational direction is effected again (in step $c_8$). If the rotational direction has been detected, it is judged whether the control knob is held under the high speed feeding condition (in step $c_{11}$). That is to say, it is judged whether the control knob has been rotated in either direction more than a predetermined angular value. If yes, the take-up motor (wind side) is actuated at a second high speed faster than the first low speed.

That is to say, in this case, since it is considered that the slack in the film has already been eliminated due to the rotation of the supply reel 201, the motor can be rotated at high speed under the control of the control knob 222. Incidentally, if the control knob 222 is not set under the high speed feeding condition, the motor is actuated at low speed as is usual (step $c_{10}$).

On the other hand, in the step $c_5$, if the control knob is not turned toward the wind side (direction a in FIG. 17) but toward the rewind side (in step $c_6$), it is judged whether the rotational direction of the supply reel 201 is detected or not (in the step $c_7$); if not, the sequence returns to the step $c_5$ again, thus preventing the actuation of the supply motor $M_1$. Consequently, the rewinding operation cannot be performed even though the control knob 222 has been turned toward the rewind side (step $c_6$).

Further, on the other hand, if the slack in the film is eliminated and the rotational direction of the supply reel 201 has been detected (in the step $c_7$), it is judged whether the control knob turned toward the rewind side has been rotated more than the predetermined angular value to set it under the high speed feeding condition (in step $c_{13}$). If yes, high speed feeding is effected (in step $c_{14}$), whereas, if not, low speed feeding is effected (in step $c_{15}$). Thereafter, it is judged whether the film has rewound completely (in step $c_{16}$); if yes, the sequence returns to step $c_1$, whereas, if not, since it is feared that the detected rotational direction of the supply reel is different from the actual rotational direction of the supply reel, and thus, that the rotational direction is erroneously detected, the sequence returns to the step $c_5$, where the detection of the rotational direction is performed again.

According to the fifth embodiment, since the take-up reel is rotated at low speed when the loading direction of the roll film, i.e., the rotational direction of the supply reel is not detected after the winding of the leading edge of the film has been detected, it is possible to prevent the great stress due to the slack in the film from acting on the film. Further, it is possible to effect the high speed winding after the rotational direction of the supply reel 201 has been detected, and to rewind the film F on the supply reel 201 when the control knob 222 has been turned toward the rewind side. Incidentally, as mentioned above, the low speed actuation of the take-up reel is effected not as a part of the auto load operation, but as a part of the subsequent film retrieving operation. Therefore, it is possible to improve the operability of the film feeding apparatus when it is used as a part of the film retrieving system.

As mentioned above, according to the film feeding apparatus of the present invention, during the automatic film loading operation, since the detection operations for detecting the loading direction at the predetermined time intervals are repeated for the predetermined time, when the loading direction of the roll film, i.e., the rotational direction of the supply reel has not yet been detected while the leading edge of the film has already wound around the take-up reel, it is not needed to load the roll film again and/or to depress the switch again as in the conventional techniques. Therefore, the present invention simplifies the automatic loading operation and improves the operability of the film feeding apparatus.

What is claimed is:

1. A film feeding apparatus comprising:
    a driving shaft for removably receiving and holding a reel on which a film is wound and for rotating the reel;
    driving means for rotating said driving shaft in a normal or reverse direction;
    judging means for judging a rewinding direction of the film wound on the reel held by said driving shaft; and
    control means for controlling said driving means to change a rotational direction of said driving shaft in response to said rewinding direction judged by said judging means, when the film is rewound.

2. A film feeding apparatus according to claim 1, wherein said judging means includes detecting means for detecting the rotational direction of said driving shaft when the film is fed out from the reel, and the rotational direction of said driving shaft is controlled in accordance with said rotational direction detected by said detecting means.

3. A film feeding apparatus according to claim 2, wherein said judging means includes encoders which generate pulses having different phases in accordance with the rotation of said driving shaft.

4. A film feeding apparatus according to claim 1, further including a feeding unit holding said driving shaft, said driving means, said judging means and said control means; and said feeding unit is removably mounted on a projecting system for projecting an image in the film onto a projection surface.

5. A film feeding apparatus according to claim 4, wherein the projecting system includes an even number or an odd number of mirrors by each of which image light from the film is reflected to be directed to said projection surface.

6. A film feeding apparatus according to claim 5, wherein the reel is received on said driving shaft from a front surface side or a back surface side in accordance with the number of mirrors of the projecting system.

7. A film feeding apparatus according to claim 6, wherein film paths for feeding out the film from the reel differ in accordance with the orientation of the reel held on said driving shaft.

8. A film feeding apparatus according to claim 1, further comprising take-up means for taking-up the film supplied from the reel, and detecting means for detecting that the film is supplied to said take-up means,
    wherein said judging means starts the judging operation of the film rewinding direction after said detecting means has detected the film.

9. A film feeding apparatus according to claim 8, wherein, after the winding of the film on said take-up means has been detected, when said judging means judges the rewinding direction of the film, the feeding of the film is altered.

10. A film feeding apparatus according to claim 9, wherein the film is fed at a first speed until said judging means judges the rewinding direction of the film, and the film is fed at a second speed higher than the first speed after the rewinding direction has been detected.

11. A film feeding apparatus according to claim 8, wherein judging operations performed at predetermined time intervals by said judging means are repeated by any number of times, when said judging means does not judge the rewinding direction of the film within a predetermined time after the winding of the film on said take-up means has been detected.

12. A film feeding apparatus according to claim 8, further including inhibiting means for inhibiting actuation of said driving means until said judging means judges a direction to which the film is wound.

13. A film projecting system comprising:
illuminating means for illuminating a film;
optical means for projecting an image on the film illuminated by said illuminating means onto a projection surface; and
a film feeding unit removably mounted on a predetermined position, said film feeding unit including a driving shaft for removably holding a reel carrying a roll film, driving means for rotating said driving shaft in a normal or reverse direction, feeding means for feeding the film from the reel held by said driving shaft to take-up means, detecting means for detecting a rotational direction of the reel while the film is being fed from the reel to said take-up means by said feeding means, and control means for controlling said driving means to change a rotational direction of said driving shaft on the basis of an output from said detecting means when the film is rewound on the reel.

14. A system according to claim 13, further including detection means for detecting the fact that the film is wound around a take-up core of said take-up means, and wherein the rotational direction of the reel is detected by said detecting means after the winding of the film on said take-up core has been detected by said detection means.

15. A system according to claim 13, wherein said feeding means feeds the film at a first speed until said detecting means detects the rotational direction of the reel, and feeds the film at a second speed faster than said first speed after the rotational direction of the reel has been detected.

16. A system according to claim 13, wherein actuation of said driving means is inhibited until said detecting means detects the rotational direction of reel.

17. A system according to claim 13, further including indicating means for instructing a feeding direction of the film, and selection means for selectively actuating said driving means and said feeding means on the basis of the instruction from said indicating means, and wherein the instruction of said indicating means is made null until said detecting means detects the rotational direction of the reel.

* * * * *

UNITED STATES PATENT AND TRADEMARK OFFICE
CERTIFICATE OF CORRECTION

PATENT NO. : 5,020,900

DATED : June 4, 1991

INVENTOR(S) : Minoru Sashida, et al.

It is certified that error appears in the above-identified patent and that said Letters Patent is hereby corrected as shown below:

COLUMN 4:

Line 51, "20" should be deleted.

COLUMN 12:

Line 33, "said" should read --the--.

Signed and Sealed this

Twenty-seventh Day of April, 1993

Attest:

MICHAEL K. KIRK

Attesting Officer

Acting Commissioner of Patents and Trademarks